(12) United States Patent
Vidri et al.

(10) Patent No.: US 8,081,067 B2
(45) Date of Patent: *Dec. 20, 2011

(54) HINGED ARM RETAINER ARRANGEMENT

(75) Inventors: Paul I. Vidri, West Bloomfield, MI (US); Kevin L. Wolf, Jr., Macomb Township, MI (US)

(73) Assignee: Specialty Manufacturing, Inc., Pineville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/861,922

(22) Filed: Aug. 24, 2010

(65) Prior Publication Data

US 2010/0315222 A1 Dec. 16, 2010

Related U.S. Application Data

(63) Continuation of application No. 12/008,317, filed on Jan. 10, 2008, now Pat. No. 7,864,031.

(60) Provisional application No. 60/880,904, filed on Jan. 16, 2007.

(51) Int. Cl.
*B60Q 1/26* (2006.01)

(52) U.S. Cl. ............... 340/433; 340/572.8; 340/3.22; 116/46

(58) Field of Classification Search ............... 340/433, 340/434, 572.8, 3.22; 116/46
See application file for complete search history.

(56) References Cited

U.S. PATENT DOCUMENTS

| | | | | |
|---|---|---|---|---|
| 1,913,483 A * | 6/1933 | Hall | ............... | 116/52 |
| 2,107,300 A * | 2/1938 | Kilpatrick | ............... | 292/192 |
| 2,144,813 A * | 1/1939 | Roan et al. | ............... | 340/487 |
| 2,671,683 A * | 3/1954 | Heyman et al. | ............... | 292/8 |
| 2,889,497 A * | 6/1959 | Wolf et al. | ............... | 335/299 |
| 3,100,389 A * | 8/1963 | Noregaard | ............... | 70/278.4 |
| 3,153,398 A * | 10/1964 | La Vern Runkle et al. | . | 116/28 R |
| 3,336,770 A * | 8/1967 | Parsons | ............... | 70/141 |
| 4,461,160 A * | 7/1984 | Van Gompel | ............... | 70/100 |
| 4,680,571 A * | 7/1987 | Keklak et al. | ............... | 340/463 |
| 5,166,663 A * | 11/1992 | Leis | ............... | 340/433 |
| 5,177,988 A * | 1/1993 | Bushnell | ............... | 70/279.1 |
| 5,293,151 A * | 3/1994 | Rose | ............... | 340/433 |
| 5,355,117 A * | 10/1994 | Jefferson | ............... | 340/425.5 |
| 5,369,911 A * | 12/1994 | Fortunato | ............... | 49/25 |
| 5,696,484 A * | 12/1997 | Kim | ............... | 340/471 |
| 5,796,331 A | 8/1998 | Lamparter | | |
| 6,099,933 A | 8/2000 | Lamparter | | |
| 6,711,856 B1 * | 3/2004 | Hoffman | ............... | 49/386 |
| 6,778,072 B2 * | 8/2004 | Phillips et al. | ............... | 340/433 |
| 6,959,947 B2 * | 11/2005 | Sakakida et al. | ............... | 280/803 |
| 7,005,973 B2 | 2/2006 | Haigh et al. | | |
| 7,642,906 B1 * | 1/2010 | McMurrer | ............... | 340/457 |
| 2003/0061982 A1 | 4/2003 | Phillips et al. | | |
| 2006/0117820 A1 | 6/2006 | Lanigan et al. | | |

* cited by examiner

*Primary Examiner* — Daniel Wu
*Assistant Examiner* — Rufus Point
(74) *Attorney, Agent, or Firm* — Reising Ethington, P.C.

(57) ABSTRACT

A retainer arrangement that includes a retainer for retaining a hinged arm on a vehicle in a stored position positively so that the hinged arm does not move away from the vehicle unintentionally. The arrangements may be used in connection with a hinged stop arm that is attached to the side of a school bus that is deployed when the school bus stops to pick-up or drop off passengers.

16 Claims, 5 Drawing Sheets

HINGED ARM RETAINER ARRANGEMENT

REFERENCE TO RELATED APPLICATIONS

This patent application is a continuation of U.S. patent application Ser. No. 12/008,317 filed on Jan. 10, 2008, which claims priority to Provisional Patent Application No. 60/880,904 filed Jan. 16, 2007. This application claims the benefit of the aforementioned applications, and the contents of the above applications are incorporated herein by reference in their entireties.

BACKGROUND OF THE INVENTION

This invention relates generally to school busses and other vehicles having hinged arms for controlling traffic.

U.S. Pat. No. 5,796,331 granted to Ronald C. Lamparter Aug. 18, 1998 discloses an illuminated pivotal sign assembly that is commonly referred to as a stop arm in the school bus industry. The stop arm comprises a stop sign at the end of an arm that is pivotally attached to the side of a school bus. The stop arm is normally stored against the side of the school bus. However, the stop arm is deployed perpendicularly to the side of the school bus when the school bus stops to pick up passengers or let off passengers. The deployed stop arm instructs drivers of other vehicles on the roadway to stop so that these other vehicles do not pass by the stopped school bus when passengers are entering or exiting the school bus.

U.S. Pat. No. 6,099,933 granted to Ronald C. Lamparter Aug. 8, 2000 discloses a school bus that is equipped with a stop sign mechanism (i.e. a stop arm) that includes a sealed electrical actuator assembly and bezel that are mounted on the street side of the school bus and an illuminated sign assembly having integral arms that are hinged on the actuator assembly for pivotal movement. The trim bezel improves appearance and safeguards the illuminated sign in the stored position. The trim bezel also acts as a wind guard that reduces wind noise and guards against wind pivoting the illuminated sign assembly outwardly from the side panel of the bus when the bus is traveling between stops.

U.S. Pat. No. 7,005,973 granted to James A. Haigh, Richard J. Iminski, Robert C. Rabine and Kevin L. Wolf, Jr. Feb. 28, 2006 discloses an electrical actuator assembly for hinged vehicle safety devices, such as a stop arm. The actuator assembly includes an electric motor that pivots the hinged stop sign from a stored position adjacent the bus to an operative position extending outwardly of the bus in perpendicular fashion and back to the stored position, and an electrical control unit for controlling the electric motor.

Hinged arms such as stop arms and crossing control arms using one or more of the inventions described in the above patents have been manufactured and used successfully on school busses for many years. However, operation of school buses equipped with the stop arms in a high wind environment has revealed a desire for retaining the hinged arm in the stored position in a positive manner when the school bus is traveling between stops.

SUMMARY OF THE INVENTION

A retainer arrangement includes a retainer for retaining a hinged arm on a vehicle in a stored position positively so that the hinged arm does not move away from the vehicle unintentionally. The arrangement may be used in connection with a hinged stop arm that is attached to the side of a school bus that is deployed when the school bus stops to pick-up or drop off passengers. When so used, the arrangement prevents any significant unintentional movement of the stop arm away from the side of the school bus which experience has shown might occur when the school bus is traveling between stops in a high wind environment.

BRIEF DESCRIPTION OF THE DRAWINGS

Objects, features and advantages of the invention will become more apparent from the following description taken in conjunction with the accompanying drawings wherein like references refer to like parts and wherein.

DETAILED DESCRIPTION OF THE PREFERRED EMBODIMENT

Figure 1:
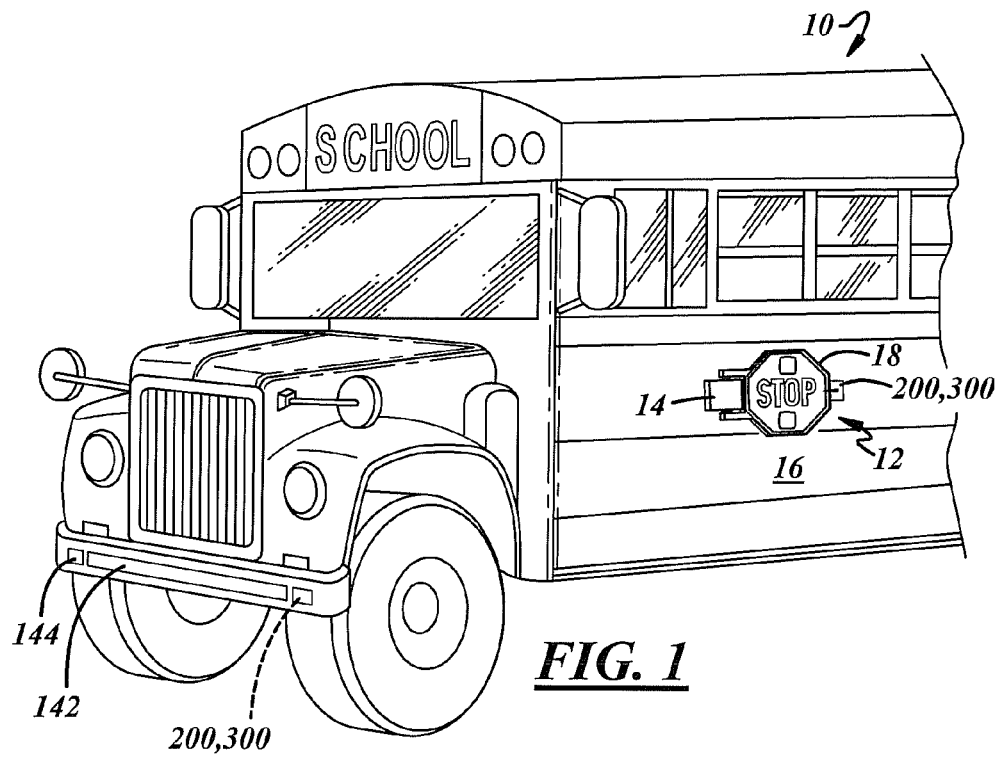
FIG. 1 is a perspective view of a school bus equipped with a stop arm arrangement that includes a retainer for retaining the stop arm in the stored position positively so that the stop arm does not move away from the side of the school bus when the school bus is traveling between stops in a high wind environment.

Referring now to the drawing, FIG. 1 shows a school bus 10 equipped with a hinged stop arm arrangement indicated generally at 12. The stop arm arrangement 12 comprises a sealed electrical actuator assembly 14 that is mounted on the side 16 of the school bus 10, a stop arm 18 having a stop sign with integral arms that are hinged on the actuator assembly 14 for pivotal movement, and a retainer arrangement 200. The actuator assembly 14 pivots the stop arm 18 between a retracted (stored) position adjacent the side 16 of the school bus 10 and an extended (deployed) position where the stop arm 18 extends outwardly of the bus side 16 in a perpendicular fashion as shown in FIG. 1.

The actuator assembly 14 provides a tamper proof and weather proof environment for several electrical and mechanical components including an electric motor and electronic control modules or units for pivoting the stop arm 18 back and forth between the stored position and the deployed position and operating the retainer arrangement 200.

The actuator assembly 14 has an outer box shaped housing 20 that comprises a base 22 that is secured to the side 16 of the bus 10 and a removable cover 24 that is secured to the base 22. The base 22 is attached to the side of bus 10 by four fasteners that extend through mounting holes in the bottom wall of base 22

Referring now to FIGS. 2, 3A, 3B, 4 and 5 it can be seen that the stop arm arrangement 12 includes a retainer arrangement 200 that is attached to the side 16 of the school bus 10 adjacent an edge of the stop arm 18 that is located diametrically opposite the actuator assembly 14. Retainer arrangement 200 includes a housing 202 for an electric servomotor 204 that is secured to four mounting pads 206 that are inside housing 202. Servomotor 204 comprises a bidirectional or reversible electric motor that drives an output shaft 208 via a speed reducing gear set. Output shaft 208 is accessible via a hole 210 through the front wall of housing 202. A lock arm 212 is attached to the output shaft 208 to rotate with the output shaft 208 from a generally horizontal lock position that overlies an outer edge portion of the stop arm 18 as shown in solid line in FIGS. 2, 3A and 3B so that the stop arm 18 is retained in the stored position positively and does not move away from the side of the school bus 10 when the school bus 10 is traveling between stops even in a high wind environment. Retainer arrangement 200 preferably includes an elastomeric stop pad 214 that engages the back of the stop arm 18 when the stop arm 18 is retained in the stored position.

Figure 2:
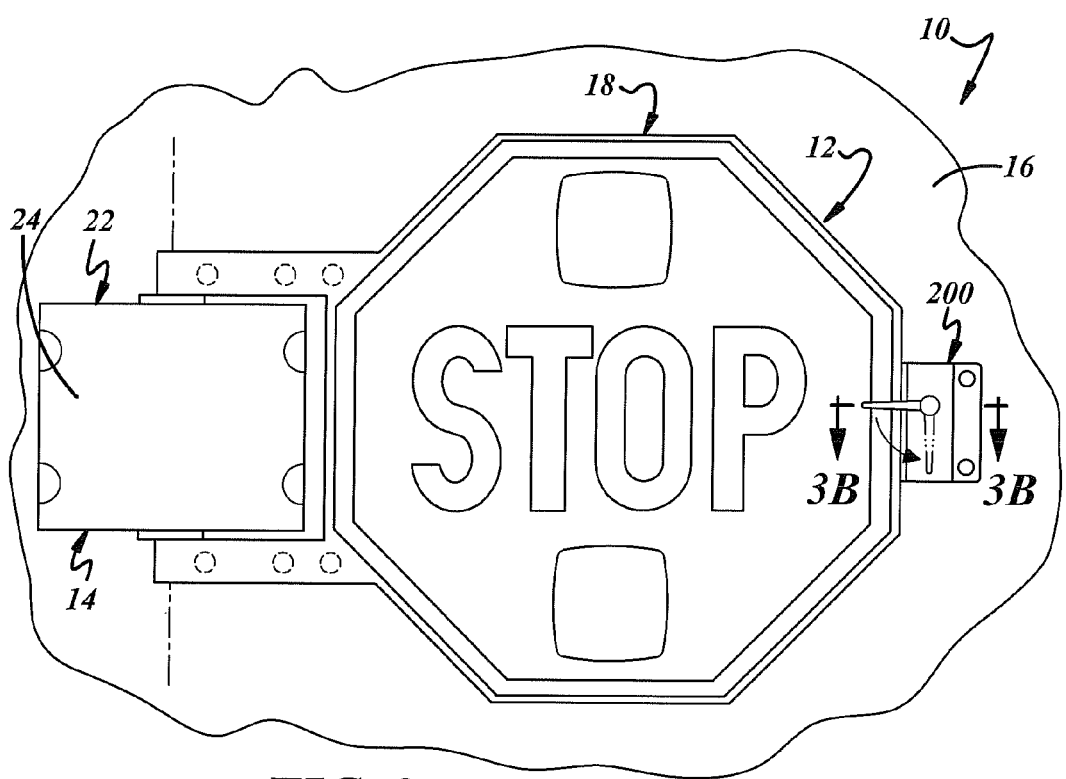
FIG. 2 is a front view of the stop arm arrangement and surrounding side portion of the school bus that is shown in FIG. 1 with the stop arm shown in a stored position against the side of the school bus.
Figure 4:
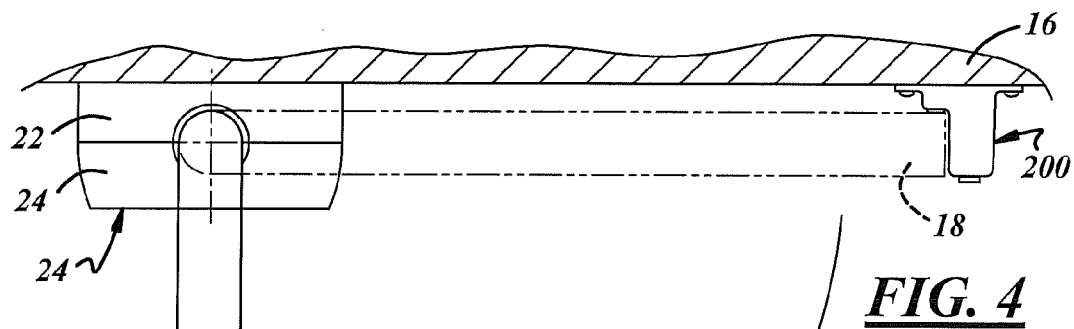
FIG. 4 is a top view of the stop arm arrangement and surrounding side portion of the school bus that is shown in FIG. 1 with the stop shown in a deployed position substantially perpendicular to the side of the school bus.

Lock arm 212 is rotated counter clockwise substantially 90 degrees from the lock position to a generally vertical release position shown in phantom lines in FIG. 2 and in solid line in FIG. 4. This frees the outer edge portion of the hinged stop arm 18 when the school bus stops for taking on or letting off passengers so that the stop arm 18 can be moved from the stored position shown in phantom in FIG. 4 to the extended deployed position shown in solid line in FIGS. 1 and 4 for controlling traffic when the school bus 10 is stopped.

Electric servomotor 204 preferably comprises a fast, high torque bidirectional electric motor so that the lock arm 212 can be moved from the lock position to the release position quickly even if the lock arm 212 is attached to the stop arm 18 by ice or other debris due to operation in inclement weather or a harsh environment.

A suitable electric servomotor is a Futaba S3305 Servo High-Torque Standard with metal gears having the following torque and speed characteristics: torque characteristics of 7.1 kg-cm (99 oz. in.) at 4.8 volts and 8.9 kg-cm (99 oz. in.) at 6 volts and speed characteristics of 0.25 sec/60 deg at 4.8 volts and 0.20 sec/60 deg at 6 volts. This electric servomotor is available from several manufacturers such as Futuba, Hitec, GWS or Multiplex.

Figure 6:
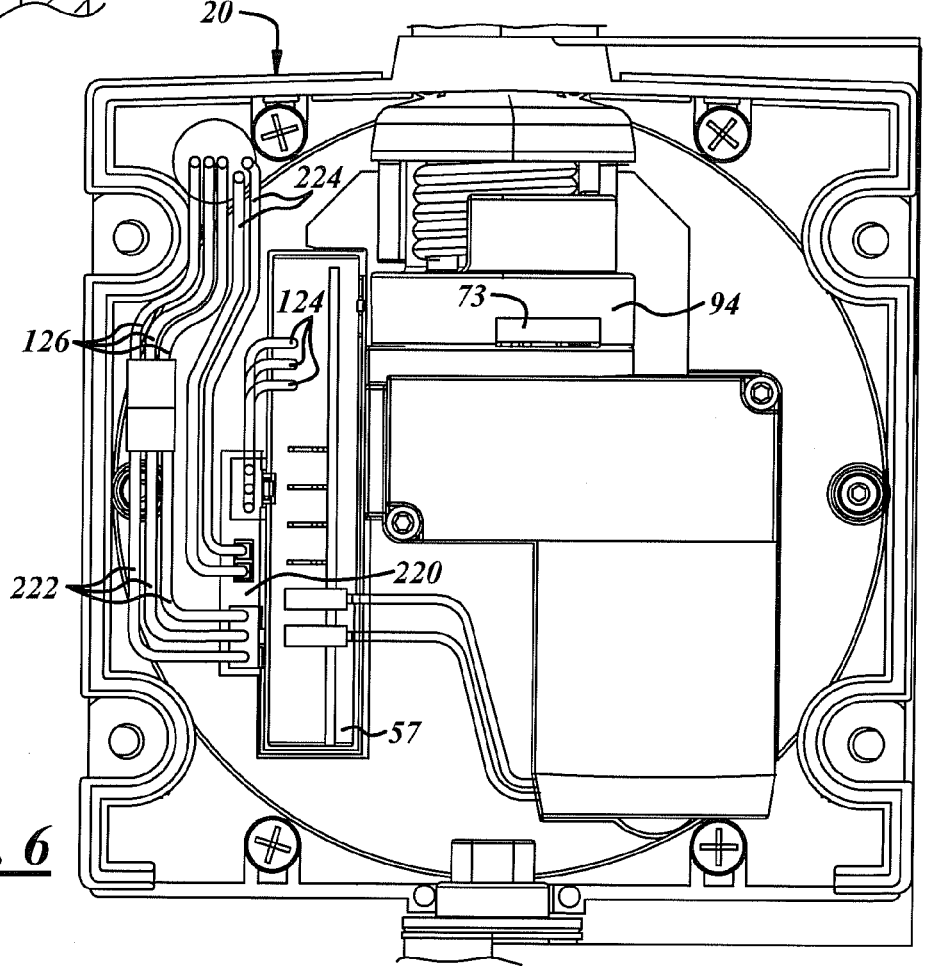
FIG. 6 is a front view of the actuator shown in FIGS. 1 and 2 with the cover removed to show internal detail.
Figure 7:
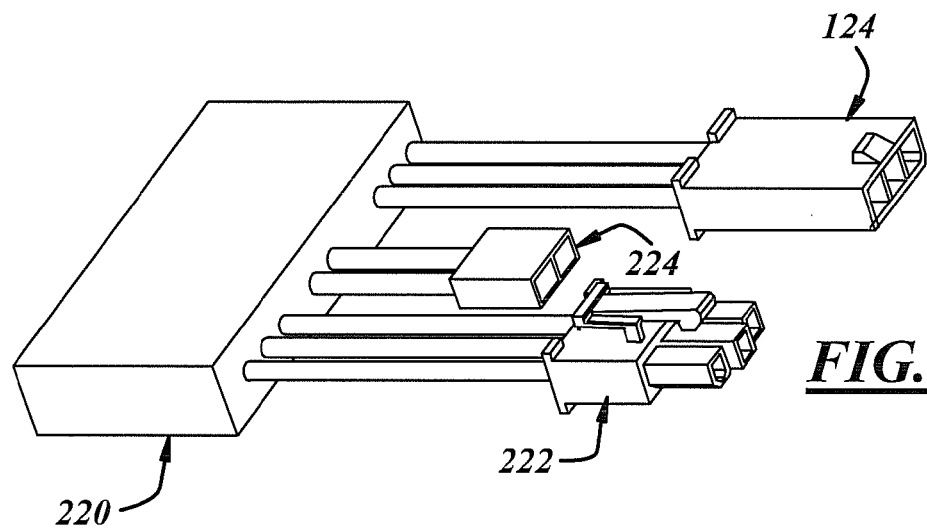
FIG. 7 is a perspective view of a component of the actuator shown in FIG. 6.

FIG. 6 is a front view of the actuator assembly 14 shown in FIGS. 1 and 2 with the cover 20 removed to show internal detail. Actuator assembly 14 includes a bidirectional electric motor that moves the stop arm 18 between the stored position and the extended deployed position, the motor being controlled by means of an electronic control module 57 that includes Hall effect sensors 79 and 80 that sense the positions of a motor driven input member 94 that holds permanent magnets 71 and 73. The operation of the electric motor by the electronic control module 57 is described in detail in U.S. Pat. No. 7,005,973 granted to James A. Haigh, Richard J. Iminski, Robert C. Rabine and Kevin L. Wolf, Jr. Feb. 26, 2006 which is incorporated herein by reference.

Actuator assembly 14 also includes a second electronic control module 220 for controlling the retainer arrangement 200 and the electric motor 55 via electronic control module 57. The electronic control module 220 is attached to the side of the electronic control module 57. The second electronic control module 220 has an input wiring harness 222 that is connected to a pig tail 126 that leads out of the outer housing 20 and into the bus 10 to connect to an electrical power source and control switch 185 shown schematically in FIG. 8. The second electronic control module 220 is connected to the electronic control module 57 by sub-harness 124 that is attached to a circuit board inside the electronic control module 57 as described in U.S. Pat. No. 7,005,973 cited above.

The second electronic control module 220 is also connected to the bidirectional electric motor of the electric servomotor 204 that operates the lock arm 212 by a wiring harness 224. The insulated leads of the wiring harness 224 that extend between the actuator assembly housing 20 and the retainer housing 202 are preferably covered with a plastic conduit cover (not shown).

The second electronic control module 220 is essentially a bidirectional electric motor control for operating the retainer arrangement 200 and a timer that delays deployment of the hinged stop arm 18 or rotation of the lock arm 212 to the generally horizontal lock position. When switch 185 is moved to a first position or closed, the bidirectional motor of the electric servo motor 204 is energized and lock arm 212 is rotated from the lock position shown in solid line in FIGS. 2, 3A and 3B to the release position shown in phantom line in FIG. 2 and in FIG. 4 where the bidirectional electric motor of electric servomotor 204 is deenergized and stopped in any conventional manner well known to those skilled in the motor control art.

Figure 8:
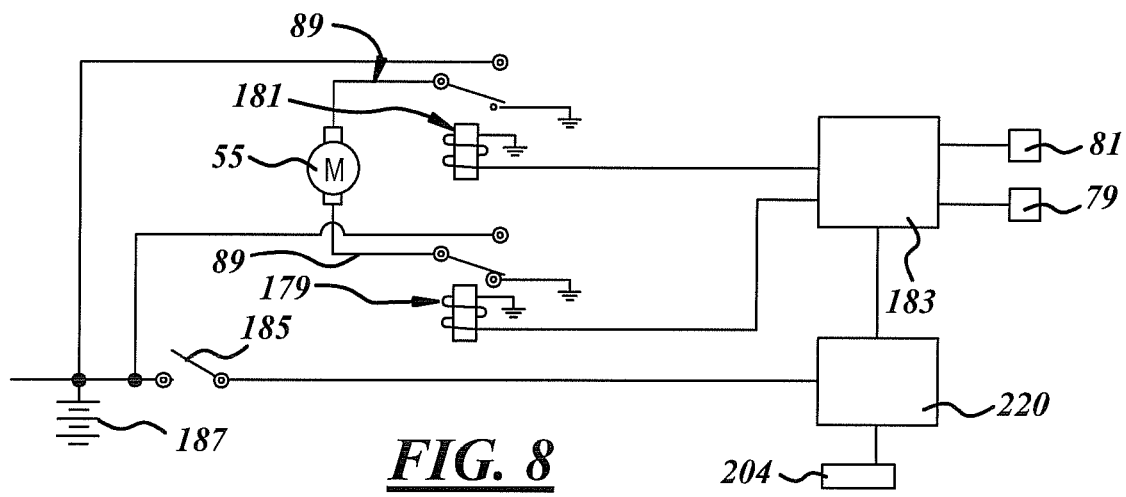
FIG. 8 is a schematic diagram of the electrical circuit controlling the electrical motor for moving the stop arm shown in FIGS. 1 and 2.

When switch 185 is closed, and after a delay, for instance one second or less, relay 179 is then automatically activated via the interface device 183, connecting one side of motor 55, that is, the lower side of motor 55 as viewed in FIG. 8 to an electrical power source and the other side to ground. Electric motor 55 is preferably a direct current (DC) motor and the electric power source can simply be a battery 187 which may conveniently be the lead storage battery of bus 10. Motor 55 then rotates clockwise pivoting stop arm 18 outward. As stop arm 18 pivots outward, magnet 73 on input member 94 is moved toward Hall effect sensor 81. When stop arm 18 reaches the deployed or extended position, magnet 73 aligns with Hall effect sensor 81 producing a signal in interface device 183 that indicates the deployed position of stop arm 18 and that causes relay 181 to activate and connect the other side, that is, the upper side of motor 55 as viewed in FIG. 8 to battery 187. This stops DC motor 55 which then acts as a dynamic brake holding stop arm 18 in the deployed position.

Stop arm 18 is returned to the stored position against the side of bus 10 by moving switch 185 to a second or open position, which as indicated above can be done automatically with the closing of the bus door. When switch 185 is opened, electronic control module 220 deactivates relay 179 via control module 57 so that the lower side of motor 55 is grounded. Motor 55 then rotates in the opposite direction, that is, counterclockwise pivoting stop arm 18 inward toward the side of bus 10. When stop sign assembly 18 reaches the stored position, magnet 71 aligns with the Hall effect sensor 79 producing a signal that indicates the stored position of stop sign assembly 18 and that causes relay 181 to deactivate and connect the upper side of motor 55 to ground. This stops motor 55 and holds stop sign assembly 18 in the stored position because DC motor 55 now acts as a dynamic brake. The circuit has now returned to the condition shown in FIG. 8 where both sides of DC motor 55 are connected to ground via wire leads 89 and relays 179 and 181.

Figure 3A:
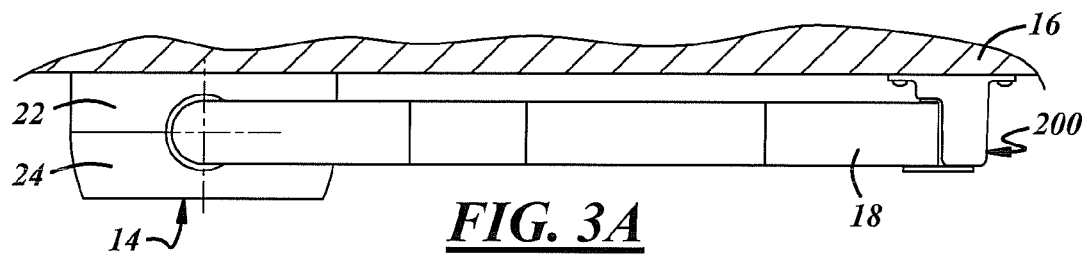
FIG. 3A is a top view of the stop arm arrangement and surrounding side portion of the school bus that is shown in FIG. 1 with the stop shown in a stored position against the side of the school bus.
Figure 3B:
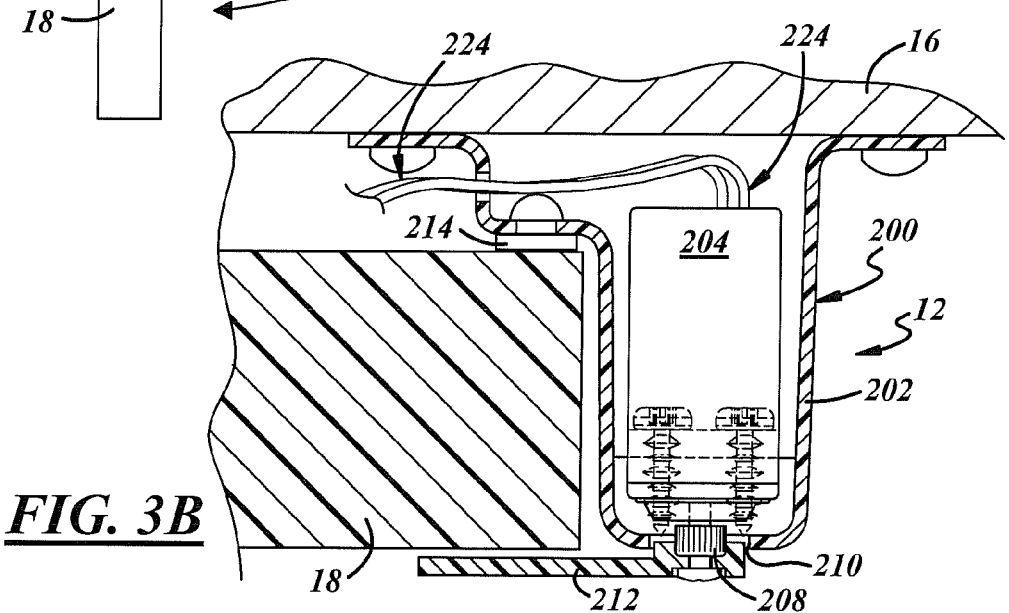
FIG. 3B is an enlarged view taken substantially along the line 3B-3B of FIG. 2 looking in the direction of the arrows showing details of a retainer that is shown in FIGS. 1 and 2.
Figure 5:
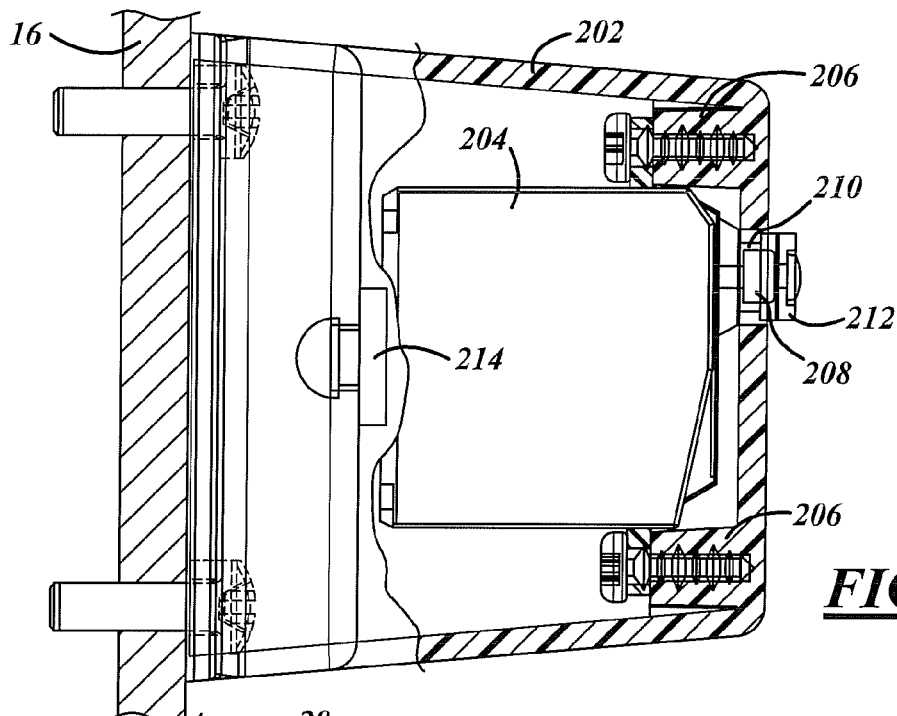
FIG. 5 is a partially sectioned front view of the retainer.

When switch 185 is opened and after a delay of a few seconds, electronic control module 220 automatically energizes the bidirectional motor of the electric servomotor 204 so that lock arm 212 rotates clockwise about 90 degrees back to the horizontal lock position shown in solid line in FIGS. 2, 3A and 3B to hold the stop arm 18 in the stored position in a positive manner. It should be noted that the delayed return of the lock arm 212 to the lock position allows for considerable overlap of the lock arm 212 with the edge portion of the hinged stop arm 18.

Referring now to FIGS. 9, 10, 11 and 12, it can be seen that the hinged stop arm arrangement 12 may include an alternate retainer arrangement 300 and alternate electronic control module 320 in place of retainer arrangement 200 and electronic control module 220 that are described above. Retainer arrangement 300 may also be attached to the side 16 of the school bus 10 adjacent an edge of the hinged stop arm 18 that is located diametrically opposite the actuator assembly 14 as shown in connection with retainer arrangement 200 in FIG. 2.

Figure 9:
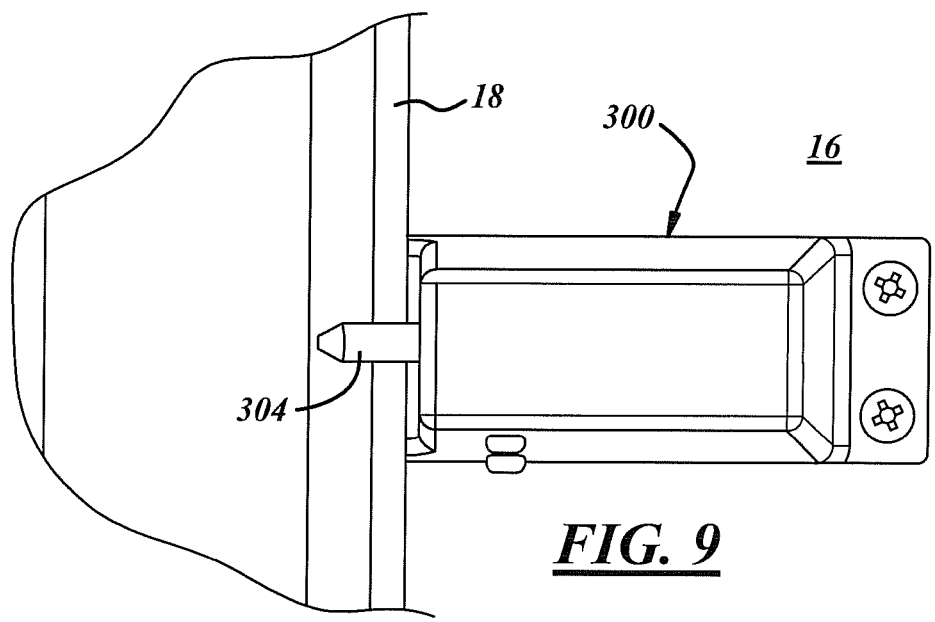
FIG. 9 is an enlargement of a portion of FIG. 2 showing details of an alternate retainer for the retainer that is shown in FIGS. 1 and 2.
Figure 10:
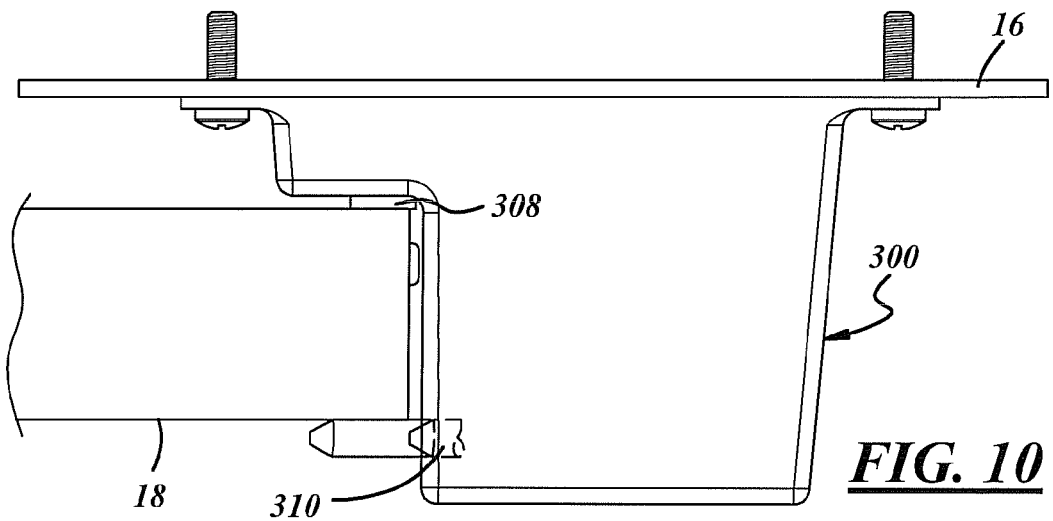
FIG. 10 is a top view of the portion of FIG. 9 showing the alternate retainer.
Figure 11:
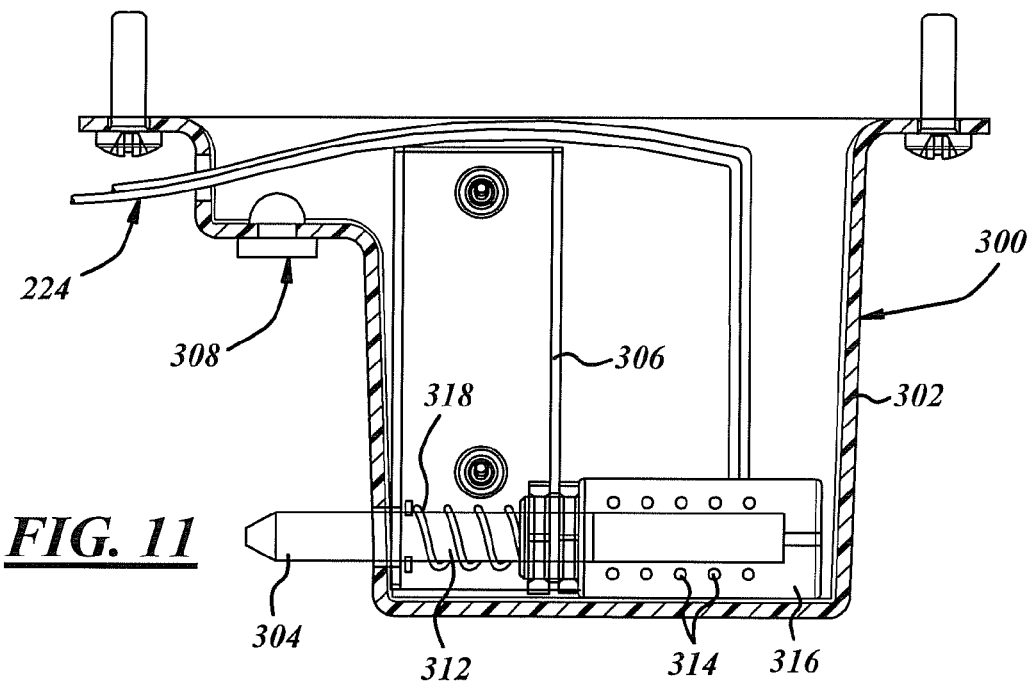
FIG. 11 is a section of the alternate retainer shown in FIG. 10.

Retainer arrangement 300 includes a housing 302 that supports a retractable lock pin 304 on a bracket 306 that is inside the housing 302. The retractable lock pin 304 moves from an extended lock position that overlies an outer edge portion of the stop arm 18 as shown in FIGS. 9, 10 and 11 so that the stop sign 18 is retained in the stored position positively and does not move away from the side of the school bus 10 when the school bus 10 is traveling between stops even in a high wind environment. Retainer arrangement 300 preferably includes an elastomeric stop pad 308 that engages the back of the stop arm 18 when the stop arm 18 is retained in the stored position.

Lock pin 304 is retracted into the housing 302 to the retracted release position shown at 310 in FIG. 10. This frees the edge of the stop sign 18 when the school bus stops for taking on or letting off passengers so that the stop arm 18 can be moved to the extended operative position for controlling traffic when the school bus 10 is stopped as shown in FIG. 1.

Retainer arrangement 300 includes a linear electric servomotor that may be a solenoid with the retractable lock pin 304 being part of or attached to a ferrous core 312 that slides in an electric coil 314 supported in a coil housing 316 that is attached to bracket 306 that is inside housing 302. Retractable lock pin 304 is preferably biased to the extended position shown in FIGS. 9, 10 and 11 by a spring 318 so that the stop arm 18 is positively retained when the coil 314 is not energized. Thus when energized, the coil 314 pulls the ferrous core 312 into the coil 314 against the action of spring 318 freeing the edge portion of the stop arm 18 so that the stop arm 18 can be moved to the extended operative position.

As stated above, FIG. 6 is a front view of the actuator assembly 14 shown in FIGS. 1 and 2 with the cover 20 removed to show internal detail. Actuator assembly 14 includes a bidirectional electric motor that moves the stop sign 18 between the stored position and the extended operative position, the motor being controlled by means of an electronic control module 57 that includes Hall effect sensors 79 and 80 that sense the positions of a motor driven input member 94 that holds permanent magnets 71 and 73. The operation of the electric motor by the electronic control module 57 is described in detail in U.S. Pat. No. 7,005,973 granted to James A. Haigh, Richard J. Iminski, Robert C. Rabine and Kevin L. Wolf, Jr. Feb. 26, 2006 which is incorporated herein by reference.

Figure 12:
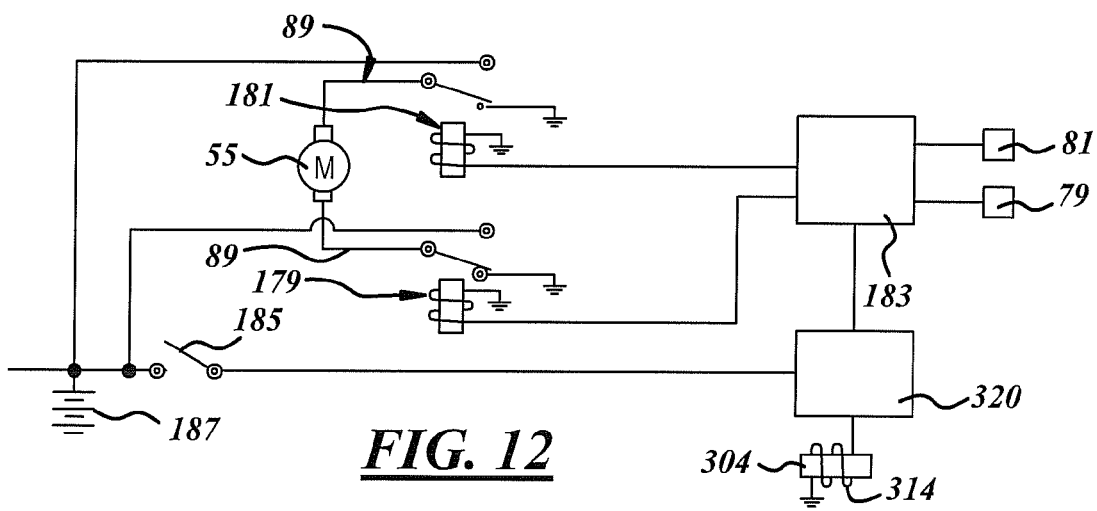
FIG. 12 is a schematic diagram of the electrical circuit controlling the electrical motor for moving the stop arm shown in FIGS. 1 and 2 in conjunction with the alternate retainer that is shown in FIGS. 9, 10 and 11.

Actuator assembly 14 may also include a modified second electronic control module 320 in place of electronic control module 220 for controlling the retainer arrangement 300 and the electric motor 55 via electronic control module 57 when the alternate retainer arrangement 300 is used. The modified electronic control module 320 shown schematically in FIG. 12 is attached to the side of the electronic control module 57 as in the case of electronic control module 220. The modified second electronic control module 320 also has an input wiring harness 222 that is connected to a pig tail 126 that leads out of the outer housing 20 and into the bus 10 to connect to an electrical power source and control switch shown schematically in FIG. 12. The modified second electronic control module 320 is also connected to the electronic control module 57 by sub-harness 124 that is attached to a circuit board inside the electronic control module 57 as described in U.S. Pat. No. 7,005,973 cited above.

The modified second electronic control module 320 is also connected to the coil 314 of the retainer arrangement 300 by a wiring harness 224. The insulated leads of the wiring harness 224 that extend between the actuator assembly housing 20 and the retainer housing 302 are preferably covered with a plastic conduit cover (not shown).

The modified second electronic control module 320 is essentially a solenoid control and timer that delays deployment of the hinged stop arm 18 or retraction of the lock pin 304. When switch 185 is moved to a first position or closed, coil 214 is energized and lock pin 304 is retracted against the action of spring 318 (shown in FIG. 11). After a delay, for instance one second or less, relay 179 is then activated via the interface device 183, connecting one side of motor 55, that is, the lower side of motor 55 as viewed in FIG. 8 to an electrical power source and the other side to ground. Electric motor 55 is preferably a direct current (DC) motor and the electric power source can simply be a battery 187 which may conveniently be the lead storage battery of bus 10. Motor 55 then rotates clockwise pivoting stop arm 18 outward. As stop arm 18 pivots outward, magnet 73 on input member 94 is moved toward Hall effect sensor 81. When stop arm 18 reaches the deployed or extended position, magnet 73 aligns with Hall effect sensor 81 producing a signal in interface device 183 that indicates the deployed position of stop arm 18 and that causes relay 181 to activate and connect the other side, that is, the upper side of motor 55 as viewed in FIG. 8 to battery 187. This stops DC motor 55 which then acts as a dynamic brake holding stop arm 18 in the deployed position. In the meantime, electronic control module 320 deenergizes coil 314 after a delay of a few seconds allowing lock pin 304 to project under the action of spring 318.

Stop sign assembly 18 is returned to the stored position against the side of bus 10 by moving switch 185 to a second or open position, which as indicated above can be done automatically with the closing of the bus door. When switch 185 is opened, electronic control module 320 deactivates relay 179 via control module 57 so that the lower side of motor 55 is grounded. Motor 55 then rotates in the opposite direction, that is, counterclockwise pivoting stop arm 18 inward toward the side of bus 10. After a delay of a few seconds, electronic control module 320 energizes coil 314 and retracts lock pin 304 as stop arm 18 pivots inward and magnet 71 approaches Hall effect sensor 79. When stop arm 18 reaches the stored position, magnet 71 aligns with the Hall effect sensor 79 producing a signal that indicates the stored position of stop arm 18 and that causes relay 181 to deactivate and connect the upper side of motor 55 to ground. This stops motor 55 and holds stop sign assembly 18 in the stored position because DC motor 55 now acts as a dynamic brake. The circuit has now returned to the condition shown in FIG. 12 where both sides of DC motor 55 are connected to ground via wire leads 89 and relays 179 and 181. The electronic control 220 preferably keeps coil 314 energized for a short period of time after it is energized, for instance about 5 seconds, so that lock pin 304 remains retracted until the stop arm 18 reaches the stored position. Coil 314 is then deenergized and the lock pin 304 extends under the action of spring 318 to hold the stop arm 18 in the stored position in a positive manner. It should be noted that the delayed deenergization of the lock pin 304 allows for considerable overlap of the lock pin 304 with the edge portion of the stop arm 18.

While a hinged arm arrangement of a particular type, that is a hinged stop arm, been described in connection with retainer arrangements, the invention is also applicable to other hinged arms such as a hinged crossing arm safety gate 142 that can be attached to the front of the bus 10 by a sealed electrical actuator assembly 144 that is identical to the electrical actuator assembly 14 and that can be illuminated via a wiring harness that passes through the outer housing of the actuator assembly as described above. Crossing arms or safety gates as well known and described in earlier Lamparter patents that are discussed in the background of the invention. In other words, the invention has been described in an illustrative manner, and it is to be understood that the terminology which has been used is intended to be in the nature of the words of description rather than of limitation.

Obviously, many modifications and variations of the present invention are possible in light of the above teachings may be made. It is, therefore, to be understood that, within the scope of the appended claims, the invention may be practiced otherwise than as specifically described.

We claim:

1. A retainer arrangement for a school bus having a hinged arm that is hinged on an actuator assembly mounted to the school bus, has a hinged end and an oppositely disposed free end, and pivots between a stored position adjacent the school bus to a deployed position extending outwardly of the school bus, the retainer arrangement being attachable to the school bus for retaining the hinged arm in the stored position positively, and comprising a retainer housing being attachable to the school bus in a location adjacent an outer edge of the hinged arm at the free end thereof diametrically opposite of the hinged arm actuator assembly and carrying an electric servo motor, and a lock member that is coupled to the servo motor, and that moves between a lock position overlying the outer edge of the hinged arm and retaining the hinged arm in the stored position and a release position that frees the outer edge of the hinged arm, allowing the hinged arm to pivot outwardly.

2. The retainer arrangement of claim 1 wherein the hinged arm is retained between the lock member and a portion of the housing in the stored position.

3. The retainer arrangement of claim 1 wherein the lock member is a lock arm that is rotated between the lock position and the release position by the electric servo motor.

4. A retainer arrangement for a school bus having a hinged arm that is hinged on an actuator assembly mounted to the school bus, has a hinged end and an oppositely disposed free end, and pivots between a stored position adjacent the school bus to a deployed position extending outwardly of the school bus, the retainer arrangement being attachable to the school bus for retaining the hinged arm in the stored position positively, and comprising a retainer housing attachable to the school bus in a location adjacent an outer edge of the hinged arm at the free end thereof diametrically opposite of the hinged arm actuator assembly and a lock member that moves between a lock position overlying the outer edge of the hinged arm and retaining the hinged arm in the stored position and a release position that frees the outer edge of the hinged arm, allowing the hinged arm to pivot outwardly wherein the lock member is a spring biased lock pin of a solenoid that is moved linearly between the lock position and the release position.

5. The retainer arrangement of claim 1 wherein the hinged arm moves from the deployed position extending outwardly of the school bus to the stored position adjacent the school bus and, after a time delay, the lock member moves to the lock position.

6. The retainer arrangement of claim 4 wherein the hinged arm moves from the deployed position extending outwardly of the school bus to the stored position adjacent the school bus and, after a time delay, the lock member moves to the lock position.

7. The retainer arrangement of claim 4 wherein the hinged arm is retained between the lock member and a portion of the housing in the stored position.

8. A retainer arrangement for a school bus having a hinged arm having a hinged end and an oppositely disposed free end, a hinged arm actuator assembly mounted to the school bus and including a bidirectional electric motor operatively connected to the hinged arm for pivoting the hinged arm between a stored position adjacent the school bus and a deployed position extending outwardly of the school bus, and a motor control module for controlling the bidirectional electric motor, the retainer arrangement comprising a retainer housing being attachable to the school bus in a location adjacent an outer edge of the hinged arm diametrically opposite of the hinged arm actuator assembly for retaining the hinged arm in the stored position positively and comprising a second control module that is operatively connected to the motor control module, the retainer arrangement having a retainer motor operatively connected to the second control module, and a lock member that is moved by the retainer motor between a lock position retaining the hinged arm in the stored position and a release position that frees the outer edge of the hinged arm, allowing the hinged arm to be pivoted outwardly by the motor, the lock member overlapping the outer edge of the hinged arm at the free end thereof when the lock member is in the lock position.

9. The retainer arrangement of claim 8, wherein the hinged arm is retained between the lock member and a portion of the retainer housing in the stored position.

10. A retainer arrangement for a school bus having a hinged arm, a hinged arm actuator assembly including a bidirectional electric motor operatively connected to the hinged arm for pivoting the hinged arm between a stored position adjacent the school bus and a deployed position extending outwardly of the school bus, and a motor control module for controlling the bidirectional electric motor, the retainer arrangement comprising a retainer housing being attachable to the school bus in a location adjacent an outer edge of the hinged arm opposite of the hinged arm actuator assembly for retaining the hinged arm in the stored position positively and comprising a second control module that is operatively connected to the motor control module, the retainer arrangement having a retainer motor operatively connected to the second control module, and a lock member that is moved by the retainer motor between a lock position retaining the hinged arm in the stored position and a release position allowing the hinged arm to be pivoted outwardly by the motor, the lock member overlapping the outer edge of the hinged arm when the lock member is in the lock position, wherein the second control module includes a first time delay after the lock member moves to the release position and before the arm pivots from the stored position to the deployed position and a second time delay after the arm pivots from the deployed position to the stored position and before lock member moves to the lock position.

11. The retainer arrangement of claim 10 wherein the retainer motor is a bidirectional electric motor and the lock member is a lock arm that is rotated between the lock position and the release position by the bidirectional electric motor.

12. The arrangement of claim 10 wherein the retainer motor is a solenoid and the lock member is a spring biased lock pin that is moved linearly between the lock position and the release position by the solenoid.

13. A retainer arrangement for a school bus having a hinged arm that is hinged on an actuator assembly mounted to the school bus, has a hinged end and an oppositely disposed free end, and pivots between a stored position adjacent the school bus to a deployed position extending outwardly of the school bus, the retainer arrangement being attachable to the school bus for retaining the hinged arm in the stored position positively, and comprising a retainer housing being attachable to the school bus and carrying at least one of a solenoid or a servo motor, and a lock member that is coupled to the at least one of the solenoid or the servo motor and that moves between a lock position overlying the outer edge of the hinged arm at the free end thereof and retaining the hinged arm in the stored position between the lock member and a portion of the housing and a release position that frees the outer edge of the hinged arm, allowing the hinged arm to pivot outwardly, wherein the retainer housing is attachable to the school bus in a location adjacent an outer edge of the hinged arm diametrically opposite of the hinged arm actuator assembly and the lock member overlies the outer edge of the hinged arm in the lock position.

14. The retainer arrangement of claim 13 further comprising an elastomeric stop pad carried by the housing to engage the hinged arm in the stored position.

15. The retainer arrangement of claim 13 wherein the hinged arm moves from the deployed position extending outwardly of the school bus to the stored position adjacent the school bus and, after a time delay, the lock member moves to the lock position.

16. The retainer arrangement of claim 13, wherein the hinged arm is retained between the lock member and a portion of the retainer housing in the stored position.

* * * * *